Feb. 17, 1931.  N. TRBOJEVICH  1,792,782
GLOBOID WORM
Original Filed April 25, 1927   2 Sheets-Sheet 1
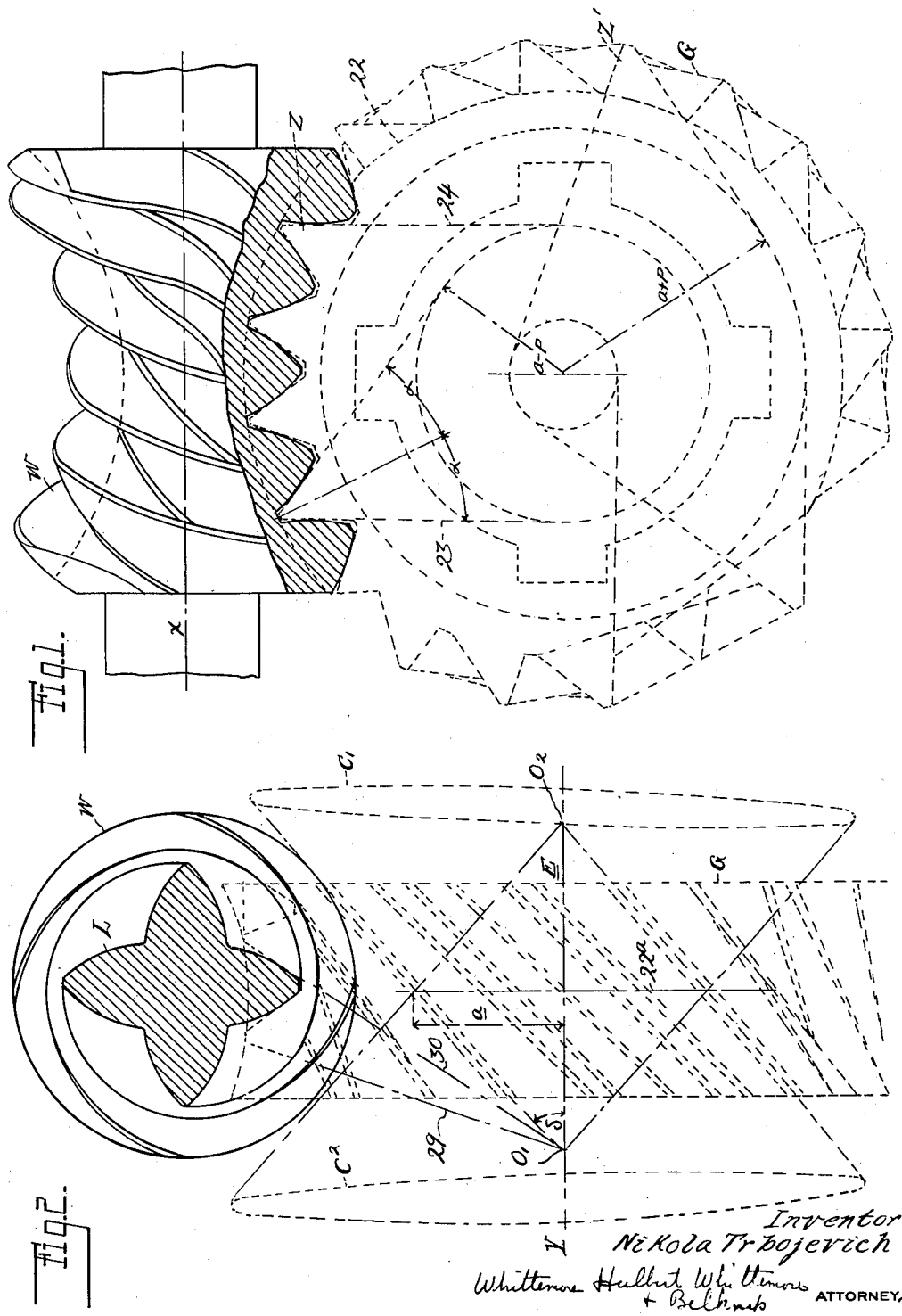

Feb. 17, 1931.  N. TRBOJEVICH  1,792,782
GLOBOID WORM
Original Filed April 25, 1927    2 Sheets-Sheet 2

INVENTOR
Nikola Trbojevich

BY Whittemore, Hulbert, Whittemore
+ Belknap   ATTORNEYS

Patented Feb. 17, 1931

1,792,782

UNITED STATES PATENT OFFICE

NIKOLA TRBOJEVICH, OF HIGHLAND PARK, MICHIGAN, ASSIGNOR TO THE TIMKEN-DETROIT AXLE COMPANY, OF DETROIT, MICHIGAN, A CORPORATION OF OHIO

GLOBOID WORM

Original application filed April 25, 1927, Serial No. 186,514. Divided and this application filed January 27, 1930. Serial No. 423,766.

The invention relates to a novel form of a globoid worm, the thread surfaces of which are generated from two base cones as it will be hereinafter explained.

This application is a division of my copending application Serial No. 186,514 filed April 25, 1927, entitled "Gearing" in which I disclosed the geometrical features of the new globoid worm in combination with a specially constructed hyperboloidal wheel. The claims in the parent application are directed to the novel form of hyperboloidal wheel but the worm has also a certain utility per se as it is capable of meshing with other than this particular hyperboloidal wheel. This application refers to the worm as an article of manufacture.

Another object of the invention is to evolve a geometrical form for an hour glass hob that can be ground in the threads after hardening to eliminate errors due to distortions of steel caused by heat treatment. An hour glass hob of this type is a counterpart of the worm in its dimensions, and its manufacture is similar to that of the worm herein described.

The object of this invention is to construct a worm that will possess certain advantages as compared with the original Hindley worm. The advantages consist both in the facility and accuracy of manufacture as well as in the improved meshing conditions with the mating wheel.

The Hindley worm, as originally constructed, possesses a profile consisting of straight lines only in any axial plane section, and a variable helix angle in the same section as measured along its hour glass contour. For that reason such a worm cannot be ground with a rotary grinder because interferences creep in above and below the midplane on account of the variable helix angle thereby interfering with the passage of a wheel having a definite diameter and angle of inclination.

I conceived the idea of so correcting the thread surface of the Hindley worm that the same will present a convex contour everywhere (so that it can be ground) and yet the pitch and the tooth contours will be theoretically correct. In order to do this I first generate the worm by rolling a straight line tangent to the base circle in the midplane, the same as in the Hindley worm. Then I raise the generating line above the midplane, reducing the diameter of the base circle at the same time, and repeat the process of generation. This will cut off certain portions of thread which are present in Hindley, but not in my worm. I repeat the process an infinite number of times and in an infinite number of planes, said planes being all parallel to the midplane of the worm and vary the diameter of the momentary base circle accordingly in such a manner that the base diameters will gradually diminish above the midplane and will increase below the said plane, that is, the aggregate of such base circles will form a cone. To generate the opposite side of the worm thread I simply invert the base cone and transpose my generating line to the other side of said cone.

While the process as above described seems more difficult than the original Hindley process, in actual practice it is simpler because the infinite number of straight line generators may now be incorporated in a single plane, and the said plane may conveniently be represented by the cutting face of a rotary milling cutter or grinder whereas in the Hindley system only an edge tool could be employed for the generation of worm.

The selection of proper base cones in this work may not be done haphazardly or by guess as the worm thread will be, as a rule, badly undercut and mutilated when improper base cones are selected. I have performed various experiments and also have analyzed this subject mathematically so that now I am in a position to give a reliable guidance to the design regarding the proper selection of the base cones. The mathematical formula governing this part of the problem will be hereinafter set forth for the first time.

In the drawings:

Figure 1 is an elevation of the new worm shown as engaging a specially constructed hyperboloidal wheel;

Figure 2 is the side view of Figure 1 showing the two base cones from which the worm thread surfaces are derived;

Figure 3:
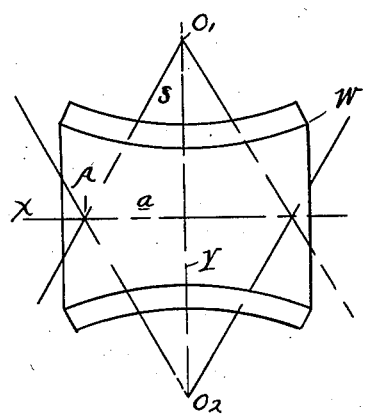
Figures 3, 4 and 5 are geometrical diagrams explaining the location of the point A at which the undercut begins and the selection of the proper base cone angle.

The construction of the new globoid worm is shown in Figures 1 and 2. Two base cones $C_1$ and $C_2$ each having a cone angle $\delta$ and the axis Y for their common axis are drawn from the apexes $O_1$ and $O_2$ respectively so that they intersect each other in a circle of a radius $a$, the base circle, in the central plane $22a$. The base radius $a$ is preferably so determined that the tangent planes 23 and 24 will be parallel to each other when they straddle a predetermined number of teeth, e. g. four teeth in the example shown in Figure 1, each tooth having a pressure angle $\alpha$. If this method of spacing the teeth should be adopted it will be possible to generate both sides of the worm in one operation by using a pair of milling cutters mounted upon the same arbor as was shown in my co-pending application for patent above referred to, Serial No. 186,514.

From the two base cones $C_1$ and $C_2$ and their respective tangent planes 23 and 24 an auxiliary hyperboloidal wheel G may now be constructed. The teeth Z of the wheel are evenly spaced along the circumference of the pitch circle 22, each tooth consisting of two plane surfaces, one of which is tangent to the base cone $C_1$ and the other to the cone $C_2$. The pressure angles for the two sides of each tooth are equal to $\alpha$ in the midplane $22a$, that is, the teeth there are symmetrical relative to the radius of the pitch circle. However, in any other plane section parallel to the plane $22a$ such as E, Figure 2, the teeth are lop-sided or non-symmetrical because one side of such a tooth $Z^1$ will be tangent to the base circle having a radius $a+p$ and the other side to radius $a-p$ as indicated in Figure 1.

The worm W may now be generated from the auxiliary hyperboloidal wheel G by rotating the former about its axis X and the latter about the the axis Y, the ratio of rotation being in an exact ratio obtained by dividing the number of teeth in the wheel by the number of teeth or threads in the worm. During this rotation the tangent plane 23 rolls over the cone $C_1$ and always remains tangent to the worm thread surface. Inasmuch as this method of generation is mathematically dependent only upon one so-called parameter, it follows from a known law of geometry that first, the thread surface of the worm is developable in a plane, second it consists of a series of straight lines and third it possesses a base curve to which all the straight line generators are tangent.

I discovered that in order to avoid the mutilation of worm teeth it is sufficient and necessary to so select the constants of generation (the ratio, center distance, base cone angle, length of worm, depth of tooth, etc.) that the base curve will always lie in the space included by the roots of the worm threads and the axis of the worm. This criterion may also be stated in other words, namely, the worm thread surfaces will be mutilated when and if the tangent plane crosses the base curve, but will not be mutilated until such an event takes place.

The new worm exhibits a curious geometrical feature which to my knowledge is new in gearing. In the gorge section of the worm (see Figure 2) the lamina L is capable of meshing with a straight sided hyperboloidal rack. The teeth of this rack are so formed that their flanks 29 and 30 converge at the cone apex $O_1$ and the opposite flanks converge at the cone apex $O_2$.

In conclusion, I shall give the mathematical equation from which the base cone angle $\delta$ and the base radius $a$ may be so determined that the undercutting of teeth will be avoided.

Figure 4:
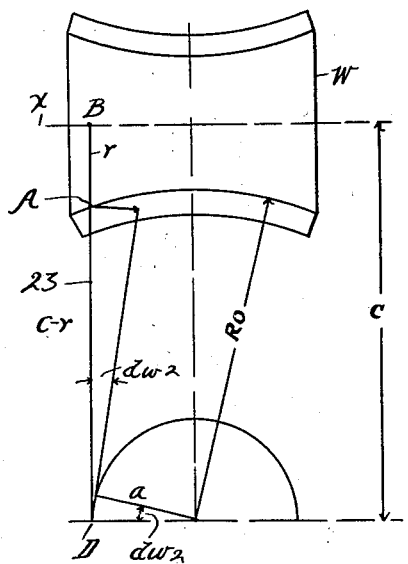

As diagrammatically shown in Figures 3 and 4, the base radius $a$ is first selected substantially such that it will be equal to about one-half of the length of the proposed worm.

The criterion of undercutting is best determined at the point A, Figure 4, said point lying in the line B D which line is tangent to the base circle and perpendicular to the worm axis X. The distance B D is equal to $c$, the center distance existing between the axes X and Y. The distance $BA=r$ is so selected that it will fall just upon the circle of a radius $Ro$, said circle being the root circle of the worm W.

In this position the tangent plane momentarily rotates about the point D and the point A lying in the said plane will, for an infinitely short time, move parallel to axis X. From this it follows that the base curve of the worm will, for an instant, be a portion of a circular helix drawn about the axis X with a radius $r$ because as the tangent plane 23 rolls about the pivot D the worm W will also rotate about its axis X with a uniform velocity.

Let now the tangent plane 23 roll upon the base circle about the pivot D through an infinitely small angle $dw_2$. During this time the worm will rotate through an angle $dw_1$, the relation being $$\frac{dw_1}{dw_2}=\frac{N}{n}=Q \quad (1)$$

where N and $n$ are the numbers of teeth in the gear and worm respectively, and Q is the constant ratio of transmission, a number usually greater than one because the worm usually has fewer teeth than the gear.

Figure 5:
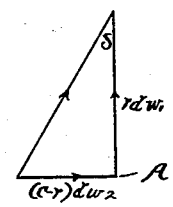

The helix angle generated at the point A, Figure 3 we now make equal to δ, the base cone angle. From the triangle in Figure 5

$$\tan \delta = \frac{(c-r) \, dw_2}{r dw_1} \quad (2)$$

or $$\tan \delta = \frac{c-r}{rQ} \quad (3)$$

Solving now for $r$ $$r = \frac{C}{1 + Q \tan \delta} \quad (4)$$

Equation 4 indicates that by increasing either the ratio Q or the base cone angle δ the distance $r$ may be reduced and the undercutting thereby avoided. It may be proved mathematically (and the experimental results which I obtained are in accord with this) that if the undercutting is avoided at the point A it will also be avoided at any other point of the worm.

What I claim as my invention is:

1. A worm having a globoid body and a spiral thread wound thereon, said thread possessing a surface of a variable curvature and convex at every point, said surface being further capable of touching a plane along a series of obliquely disposed straight lines when the worm rotates about its axis and the plane rolls upon the surface of a fixed cone having an axis non-intersecting and non-parallel relative to the worm axis in a timed relation with the worm.

2. A worm having a globoid body and a spiral thread wound thereon, said thread having two flanks, one on each side, and each capable of contacting in a line contact with a corresponding plane rolling upon the surface of a fixed cone when the said two cones are coaxial and relatively inverted in such a manner that they intersect each other in a circle lying in a plane passing through the axis of the worm and when the two planes roll in unison, in the same direction and in a timed relation with respect to the rotation of the worm.

3. A worm having a globoid body and a plurality of spiral threads wound thereon, said threads possessing bearing surfaces which are of a variable curvature and convex at every point and are further characterized by the peculiarity that one side of each thread is generated from a series of base circles all parallel to each other and to the midplane of the worm and are gradually diminishing in diameter as they approach and pass the midplane, and the other side of the thread is generated from another series of base circles ever increasing in diameter when they approach and pass the midplane.

4. A worm having a globoid body and a plurality of spiral threads wound thereon, said threads being of a variable curvature and pressure angles throughout their lengths and capable of contacting in a line contact with two planes rolling about two fixed, relatively inverted and coaxial cones drawn about an extraneous axis, said threads being further so spaced with respect to their pitch and thickness of tooth that the two rolling planes remain parallel and equidistant relative to each other during the entire duration of their engagement with the worm threads.

5. In a globoid worm two thread surfaces of a constantly varying curvature so formed that one surface is capable of contacting in a line contact with a master surface connected to and rotatable about a fixed cone having an axis disposed at right angles relative to the worm axis at a distance corresponding to the center of the curvature of the worm, and the other side contacts with another master surface connected to and rotatable about another cone, said two cones being coaxial, relatively inverted and intersecting each other in a circle in a plane passing through the axis of the worm.

In testimony whereof I affix my signature.

NIKOLA TRBOJEVICH.